(12) United States Patent
Simons

(10) Patent No.: US 7,002,083 B2
(45) Date of Patent: Feb. 21, 2006

(54) HAND TRUCK WEIGHING DEVICE AND WEIGHING METHOD

(76) Inventor: Gerald S. Simons, 6 Forest Laneway, Unit 2514, Toronto (CA) M2N 5X9

( * ) Notice: Subject to any disclaimer, the term of this patent is extended or adjusted under 35 U.S.C. 154(b) by 211 days.

(21) Appl. No.: 10/684,240

(22) Filed: Oct. 13, 2003

(65) Prior Publication Data

US 2004/0140136 A1    Jul. 22, 2004

Related U.S. Application Data

(60) Provisional application No. 60/418,131, filed on Oct. 12, 2002.

(51) Int. Cl.
*G01G 19/02* (2006.01)

(52) U.S. Cl. .................... 177/130; 177/140; 177/211; 73/862.631

(58) Field of Classification Search ................ 177/130, 177/140, 211; 73/862.631
See application file for complete search history.

(56) References Cited

U.S. PATENT DOCUMENTS

| | | | |
|---|---|---|---|
| 1,165,714 A | 12/1915 | Ruckes | 177/130 |
| 3,431,992 A | 3/1969 | Whitecar | 177/140 |
| 3,589,459 A | 6/1971 | Harvey | 177/141 |
| 3,990,032 A * | 11/1976 | Fish et al. | 338/5 |
| 4,346,771 A | 8/1982 | Persson et al. | 177/145 |
| 4,478,091 A * | 10/1984 | Forrester | 73/862.541 |
| 4,638,876 A | 1/1987 | Balduin et al. | 177/139 |
| 4,666,004 A | 5/1987 | Raz | 177/139 |
| 4,694,921 A * | 9/1987 | Johnston | 177/136 |
| 4,899,840 A | 2/1990 | Boubille | 177/139 |
| 5,239,137 A * | 8/1993 | Patzig | 177/136 |
| 5,417,536 A | 5/1995 | Cech | 177/140 |
| 5,739,478 A | 4/1998 | Zefira | 177/130 |
| 6,124,554 A | 9/2000 | Muckle et al. | 177/126 |

* cited by examiner

*Primary Examiner*—Randy W. Gibson
(74) *Attorney, Agent, or Firm*—Hodgson Russ LLP

(57) ABSTRACT

The invention includes a device for and a method of weighing. A device according to the invention is a hand truck having weight sensors in each toe-portion. A method according to the invention uses such a hand truck to provide a weight signal corresponding to the weight of an object on the hand truck.

22 Claims, 6 Drawing Sheets

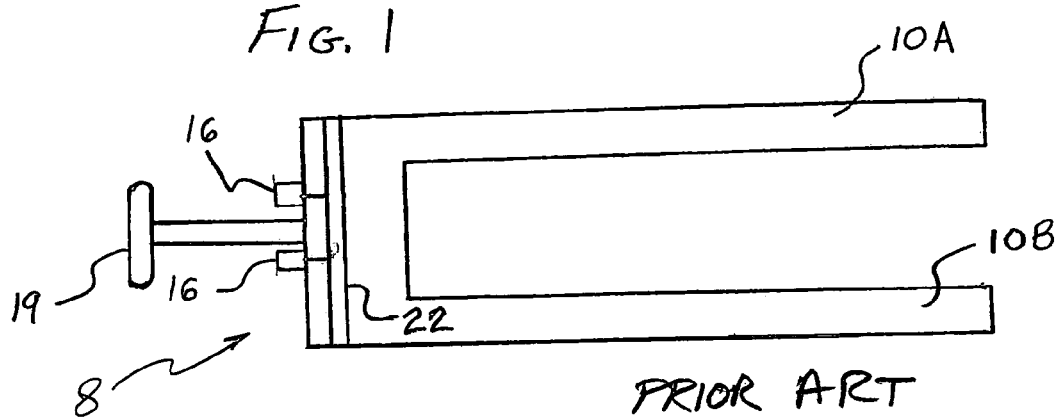
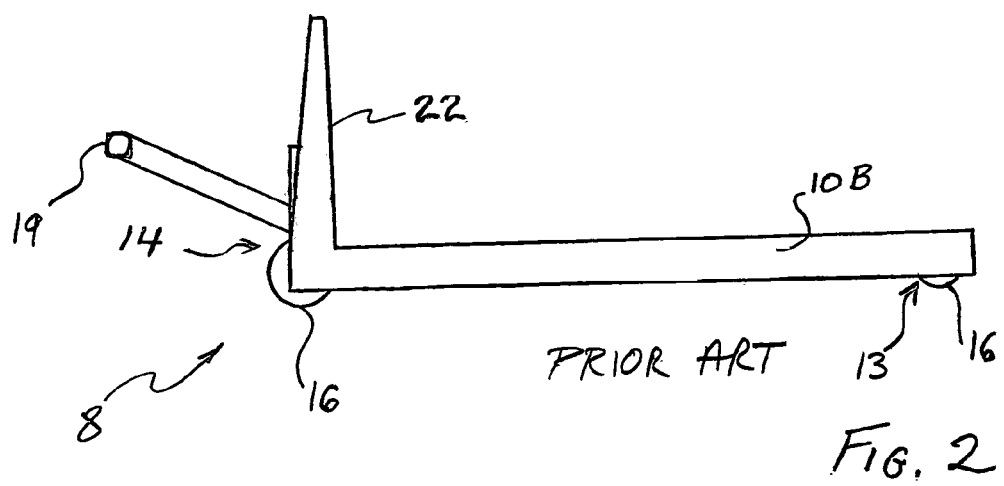

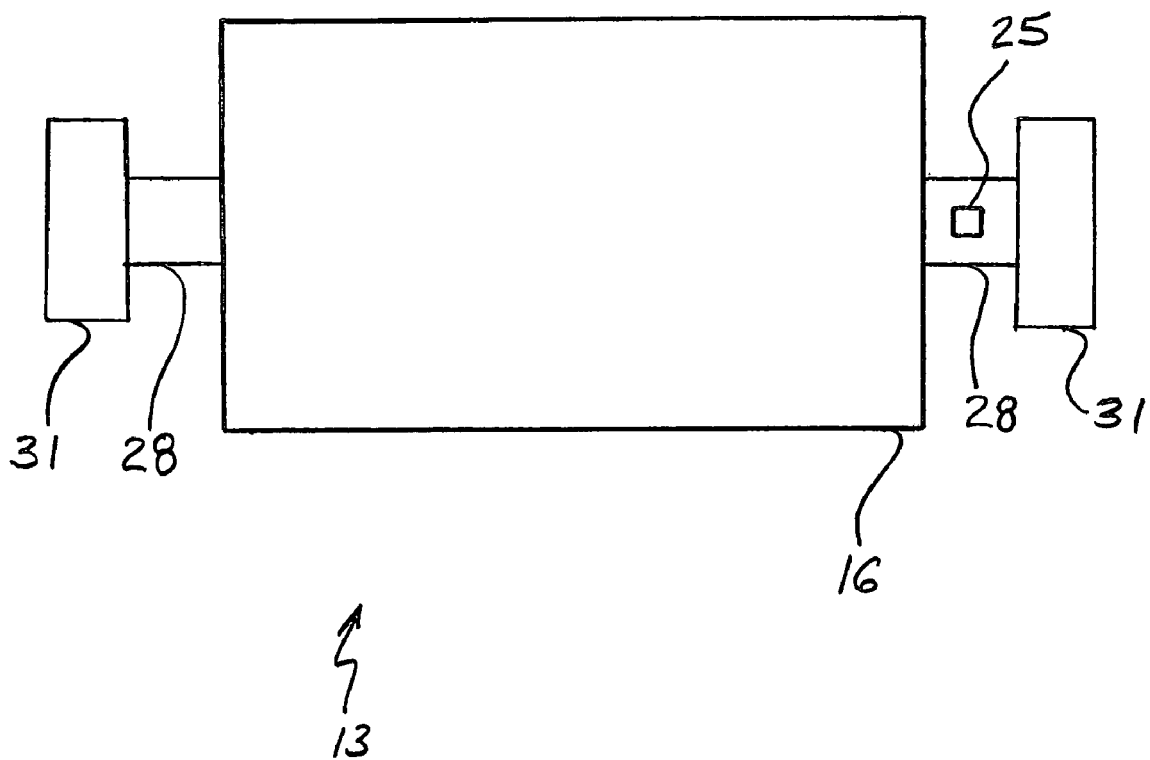

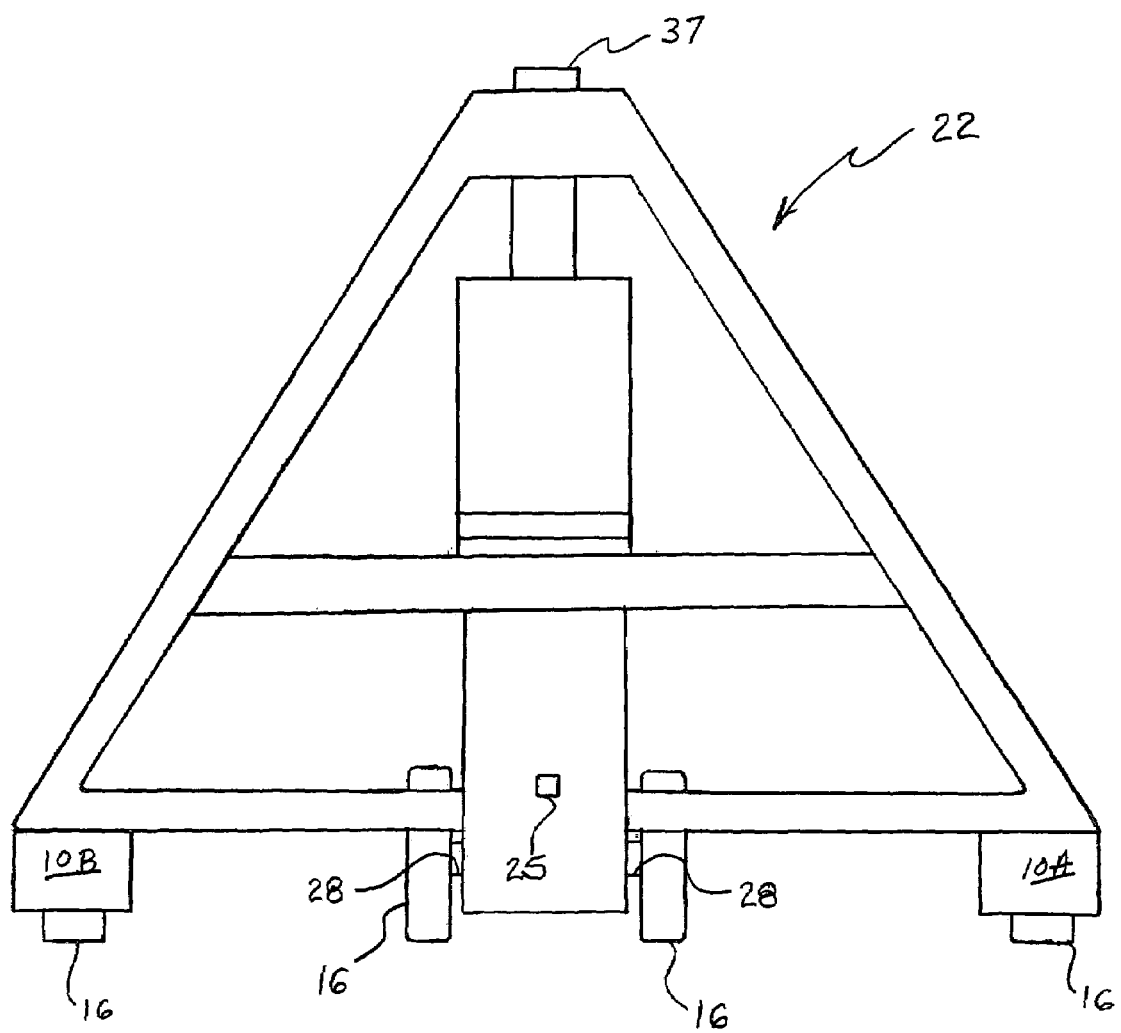

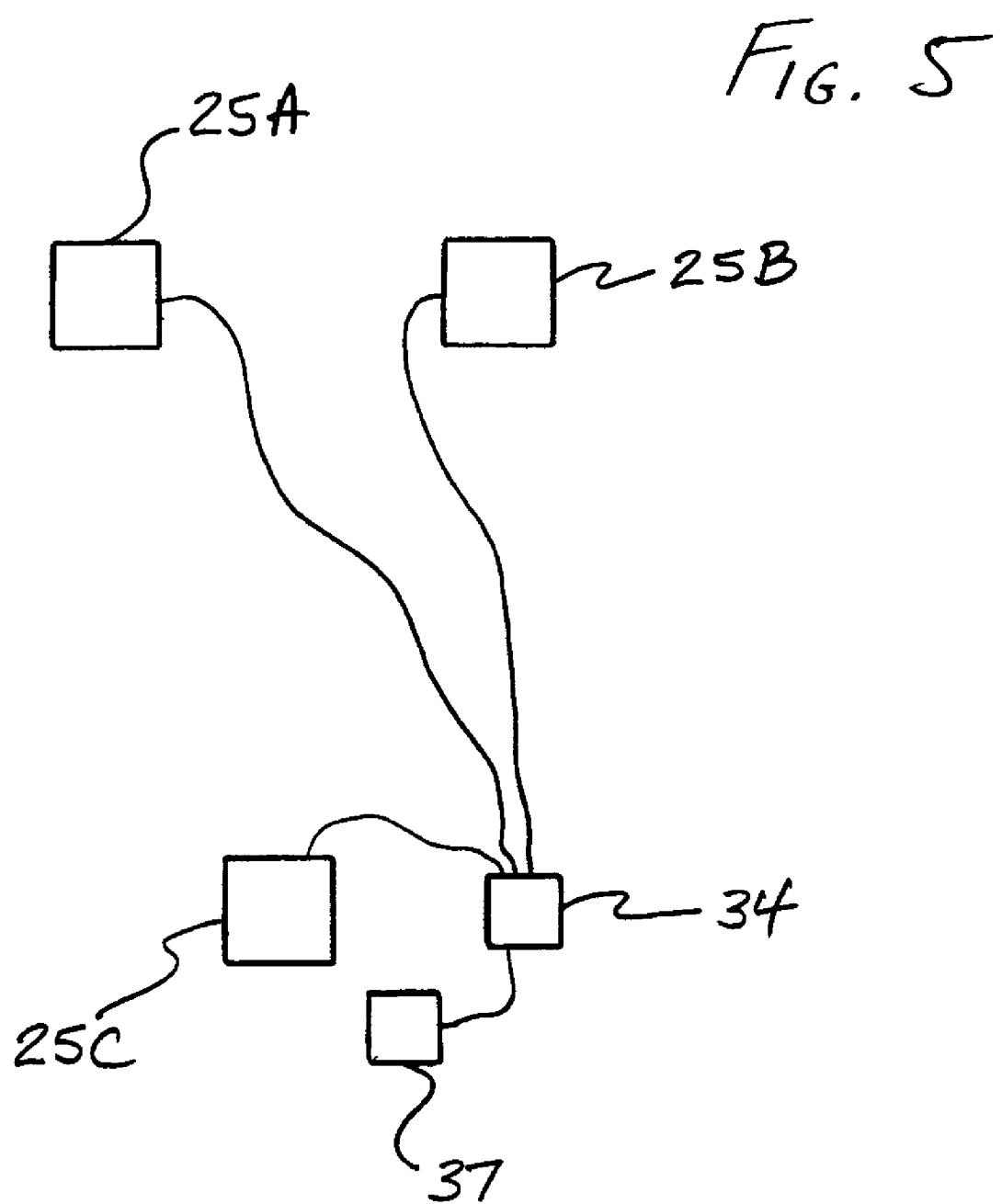

HAND TRUCK WEIGHING DEVICE AND WEIGHING METHOD

CROSS-REFERENCE TO RELATED APPLICATION

This application claims the benefit of priority to U.S. provisional patent application Ser. No. 60/418,131, filed on Oct. 12, 2002.

FIELD OF THE INVENTION

The present invention relates to devices and methods of weighing.

BACKGROUND OF THE INVENTION

Hand trucks are used to move objects from one location to another. Often, a hand truck will be used to lift a pallet, on which may be placed a heavy object, and move the pallet to a desired location. FIGS. 1 and 2 are schematic representations of a prior art hand truck. Typically, a hand truck 8 has two toe portions 10A, 10B each having a roller 13. Each roller 13 often has bearings disposed about an axle and one or more wheels 16. Sometimes, a wheel 16 will be a metal cylinder. The bearings allow the wheel 16 to rotate about the axle and also support the weight of an item supported by the hand truck 8. Such hand trucks 8 also typically have a third roller 14, which may be used to guide the hand truck 8 in a desired direction, and support the weight of an item supported by the hand truck 8. The guide roller 14 can be turned by a handle 19, in order to guide the hand truck 8 in a direction desired by the operator.

Some hand trucks 8 have a hydraulic cylinder, which may be used to raise and lower the toe portions 10A, 10B. If the toe portions 10A, 10B are inserted into a pallet, the operator may raise the pallet by pumping the handle 19 attached to the hydraulic cylinder. The handle 19, guide roller 14 and cylinder may be connected to a support structure. Often, the support structure is referred to as a "bulkhead" 22.

SUMMARY OF THE INVENTION

The invention includes a hand truck having a first toe-portion, a second toe portion and a bulkhead. The first toe portion has a first roller and a first weight sensor. The second toe portion has a second roller and a second weight sensor. The bulkhead connects the first toe-portion and the second toe-portion, and the bulkhead has a third roller.

The invention also includes a method of weighing. A hand truck may be provided, and an object may be supported by the hand truck. A weight sensor in the a toe portion of the hand truck may provide a weight-signal, and a weight corresponding to the weight-signal may be displayed.

BRIEF DESCRIPTION OF THE DRAWINGS

For a fuller understanding of the nature and objects of the invention, reference should be made to the following detailed description taken in conjunction with the accompanying drawings, in which:

FIG. 1 is a plan view of a hand truck;

FIG. 2 is a side view of the hand truck depicted in FIG. 1;

FIG. 3B depicts another roller according to the invention;

FIG. 4 depicts a hand truck according to the invention;

FIG. 5 is a schematic of a system according to the invention; and

DETAILED DESCRIPTION OF THE INVENTION

Figure 3A:
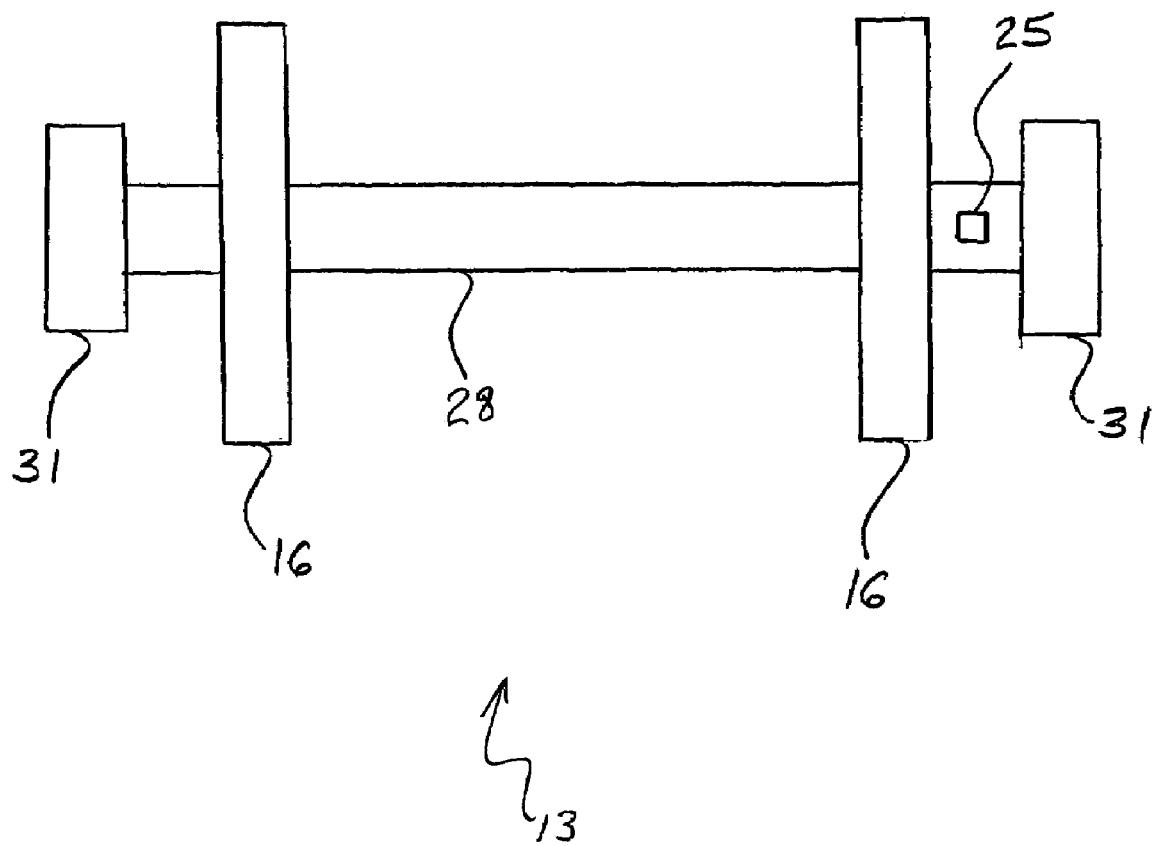
FIG. 3A depicts a roller according to the invention.

With reference to FIG. 1, FIG. 2, FIG. 3A and FIG. 3B, an embodiment of the invention is a hand truck 8, which may include a first toe-portion 10A, a second toe-portion 10B and a bulkhead 22. The bulkhead 22 may connect the first toe-portion 10A and the second toe-portion 10B. The first toe-portion 10A may have a first roller 13 and a first weight sensor 25. The second toe-portion 10B may have a second roller 13 and a second weight sensor 25. The bulkhead 22 may have a third roller 14. The bulkhead 22 may also have a third weight sensor 25. If the third weight sensor 25 is provided on the bulkhead 22, a weight sensor 25 on the third roller 14 may not be needed. A Wheatstone bridge may serve as one or more of the weight sensors 25.

With reference to FIG. 3A, FIG. 3B and FIG. 4, any of the rollers 13, 14 may have an axle 28 and a wheel 16 disposed about the axle 28. Bearings 31 may be used to support the axle 28, for example with the toe portion 10 or bulkhead 22, as the case may be. The wheel 16 may rotate about the axle 28 and also support some or all of the weight of an object supported by the hand truck 8. In such an arrangement, the weight sensor 25 may be arranged so as to sense the weight carried by the axle 28. For example, the weight sensor 25 may be mounted to the axle 28. A weight sensor 25 may also be placed on the bulkhead 22. See FIG. 4.

A hand truck 8 according to the invention may have a handle 19 joined to the third roller 14, for example via a mechanical linkage. The third roller 14 may be capable of swiveling in response to changes in a position of the handle 19. For example, if the handle 19 is moved to the left of the bulkhead 22, the third roller 14 turns left.

A device according to the invention may have a microprocessor 34 in communication with the weight sensors 25. See FIG. 5. The microprocessor 34 may be capable of receiving a weight-sensor-signal from one or more of the weight sensors 25. The weight-sensor-signal may correspond to the weight sensed by the corresponding weight sensor 25. For example, the weight-sensor-signal may indicate the weight supported by the structure to which the weight sensor 25 is attached. The microprocessor 34 may be capable of determining a sum, which may be determined by adding the weight sensed by the first weight sensor 25 and the weight sensed by the second weight sensor 25, and any other weight sensors 25. In this manner, a total weight carried by the hand truck 8 may be determined.

The hand truck 8 may include a display 37, such as a liquid crystal display or light emitting diode display. The display 37 may be in communication with the microprocessor 34, which may provide a sum-signal to the display 37. Upon receiving the sum-signal, the display 37 may provide a person with information corresponding to the weight being carried by the hand truck 8 and sensed by the weight sensors 25. The microprocessor 34 and display 37 may also cooperate to provide a person with information corresponding to the weight being sensed by one of the weight sensors 25, or the sum of the weight being sensed by any combination of the weight sensors 25.

Figure 6:
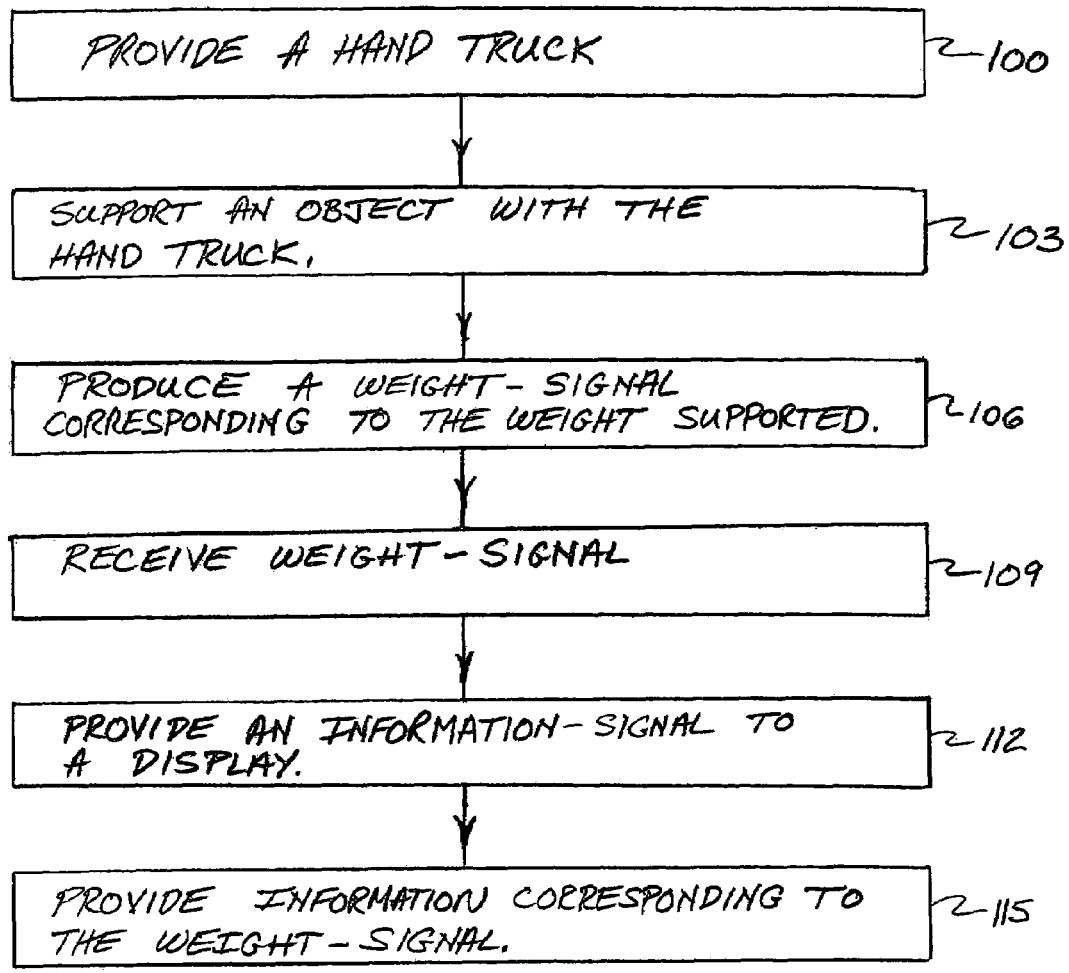
FIG. 6 is flow chart of a method according to the invention.

In a method according to the invention, the weight being carried by a hand truck, or a portion of the hand truck, may be determined. Referring to FIG. 6, in such a method a hand truck 100 is provided. The hand truck may have a first toe-portion, a second toe-portion and a bulkhead, which connects the first toe-portion and the second toe-portion. Each toe-portion may have a weight sensor mounted thereon. An object may be supported 103 by the hand truck. Each weight sensor may produce 106 a weight-signal, which corresponds to the weight being supported by that portion of the hand truck associated with the weight sensor. Each weight-signal may be received 109, for example by a microprocessor. The microprocessor may provide 112 an information-signal to a display in order to cause the display to provide 115 information corresponding to at least one of the weight signals. The information provided by the display may be a number representing the weight corresponding to a sum of weights indicated by the weight-signals.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A hand truck comprising:
    a first toe-portion having a first roller and a first weight sensor, wherein the first roller has an axle and a wheel disposed about the axle, and the first weight sensor is mounted to the axle;
    a second toe-portion having a second roller and a second weight sensor;
    a bulkhead connecting the first toe-portion and the second toe-portion, and having a third roller.

2. The hand truck of claim 1, further comprising a third weight sensor mounted to the bulkhead.

3. The hand truck of claim 2 further comprising a third weight sensor mounted to the third roller.

4. The hand truck of claim 1, wherein the third roller has an axle and a wheel disposed about the axle, and wherein the hand truck further comprises a third weight sensor mounted to the axle.

5. The hand truck of claim 1, further comprising a handle joined to the third roller, and the third roller is capable of swiveling in response to changes in a position of the handle.

6. The hand truck of claim 1, further comprising a microprocessor in communication with the weight sensors and capable of receiving a weight-sensor-signal from at least one of the weight sensors, the weight-sensor-signal corresponding to a weight sensed by the corresponding weight sensor.

7. The hand truck of claim 6, wherein the microprocessor is capable of determining a sum, the sum being determined by adding the weight sensed by the first weight sensor and the weight sensed by the second weight sensor.

8. The hand truck of claim 7, further comprising a display in communication with the microprocessor, and the microprocessor is further capable of providing a sum-signal to the display, and the display is capable of providing information corresponding to the sum-signal to a person.

9. The hand truck of claim 1, further comprising a display in communication with at least one of the weight sensors, the display being capable of receiving a weight-sensor-signal corresponding to a weight sensed by the at least one of the weight sensors, the weight-sensor-signal corresponding to the weight sensed by the at least one of the weight sensors, and the display is capable of providing information corresponding to the weight-sensor-signal.

10. A method of weighing, comprising:
    providing a hand truck having a first toe-portion, a second toe-portion and a bulkhead connecting the first toe-portion and the second toe-portion, each toe-portion having a weight sensor mounted thereon, and wherein the first toe-portion includes a roller having an axle and a wheel disposed about the axle, and the first weight sensor is mounted to the axle;
    placing an object on the hand truck;
    receiving at least one weight-signal from at least one of the weight sensors;
    displaying information corresponding to the weight signal.

11. The method of claim 10, wherein a weight-signal is received from all the weight sensors, and the displayed information is a number corresponding to a sum of weights indicated by the weight-signals.

12. A hand truck comprising:
    a first toe-portion having a first roller and a first weight sensor;
    a second toe-portion having a second roller and a second weight sensor;
    a bulkhead connecting the first toe-portion and the second toe-portion, the bulkhead having a third roller that includes an axle and a wheel disposed about the axle, and wherein the hand truck further comprises a third weight sensor mounted to the axle.

13. The hand truck of claim 12, further comprising a third weight sensor mounted to the bulkhead.

14. The hand truck of claim 13 further comprising a third weight sensor mounted to the third roller.

15. The hand truck of claim 12, wherein the first roller has an axle and a wheel disposed about the axle, and the first weight sensor is mounted to the axle.

16. The hand truck of claim 12, further comprising a handle joined to the third roller, and the third roller is capable of swiveling in response to changes in a position of the handle.

17. The hand truck of claim 12, further comprising a microprocessor in communication with the weight sensors and capable of receiving a weight-sensor-signal from at least one of the weight sensors, the weight-sensor-signal corresponding to a weight sensed by the corresponding weight sensor.

18. The hand truck of claim 17, wherein the microprocessor is capable of determining a sum, the sum being determined by adding the weight sensed by the first weight sensor and the weight sensed by the second weight sensor.

19. The hand truck of claim 18, further comprising a display in communication with the microprocessor, and the microprocessor is further capable of providing a sum-signal to the display, and the display is capable of providing information corresponding to the sum-signal to a person.

20. The hand truck of claim 12, further comprising a display in communication with at least one of the weight sensors, the display being capable of receiving a weight-sensor-signal corresponding to a weight sensed by the at least one of the weight sensors, the weight-sensor-signal corresponding to the weight sensed by the at least one of the weight sensors, and the display is capable of providing information corresponding to the weight-sensor-signal.

21. A method of weighing, comprising:
    providing a hand truck having a first toe-portion, a second toe-portion and a bulkhead connecting the first toe-portion and the second toe-portion, each toe-portion having a weight sensor mounted thereon, and wherein the bulkhead has a roller that includes an axle, a wheel disposed about the axle, and a third weight sensor mounted to the axle;
    placing an object on the hand truck;
    receiving at least one weight-signal from at least one of the weight sensors;
    displaying information corresponding to the weight signal.

22. The method of claim 21, wherein a weight-signal is received from all the weight sensors, and the displayed information is a number corresponding to a sum of weights indicated by the weight-signals.

* * * * *